United States Patent [19]

Brown et al.

[11] 4,399,182
[45] Aug. 16, 1983

[54] DECORATIVE LAMINATE OF THERMOPLASTIC MATERIAL

[75] Inventors: Kenneth D. Brown, Tynemouth; Terence C. O'Neill, Cramlington, both of England

[73] Assignee: Internationale Octrooi Maatschappij "Octropa" B.V., Rotterdam, Netherlands

[21] Appl. No.: 348,049
[22] PCT Filed: Jun. 25, 1981
[86] PCT No.: PCT/GB81/00109
   § 371 Date: Feb. 5, 1982
   § 102(e) Date: Feb. 5, 1982
[87] PCT Pub. No.: WO82/00021
   PCT Pub. Date: Jan. 7, 1982

[30] Foreign Application Priority Data

Jun. 25, 1980 [GB] United Kingdom ............... 8020829

[51] Int. Cl.³ ............................................. B32B 27/08
[52] U.S. Cl. ..................................... 428/215; 428/518; 428/424.6; 428/520; 428/352; 428/354
[58] Field of Search ............ 428/213, 215, 518, 429.6, 428/520

[56] References Cited

U.S. PATENT DOCUMENTS

| | | | |
|---|---|---|---|
| 3,131,069 | 4/1964 | Goller et al. | 428/518 X |
| 3,725,184 | 4/1973 | Scopp | 428/518 X |
| 3,806,397 | 4/1974 | Kukoff | 428/518 X |
| 4,180,615 | 12/1979 | Bettoli | 428/424.6 X |
| 4,333,987 | 6/1982 | Kwart et al. | 428/424.6 |

Primary Examiner—P. C. Ives
Attorney, Agent, or Firm—Cushman, Darby & Cushman

[57] ABSTRACT

A decorative laminate of thermoplastic material which is capable of obscuring surface imperfections in the surface to which it is applied comprises a base layer containing not more than 2% by weight of plasticizer and a decorative layer, the base layer being two to four times the thickness of the decorative layer and the laminate having a total thickness of between 250 and 450 microns and a shrinkage of less than 0.5% at ambient temperatures.

2 Claims, 1 Drawing Figure

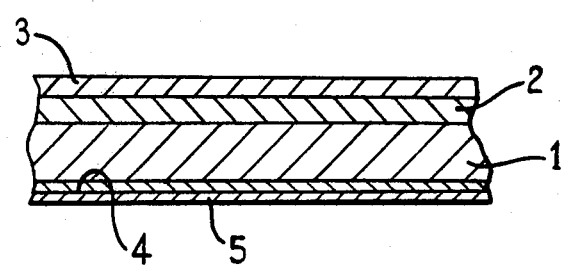

DECORATIVE LAMINATE OF THERMOPLASTIC MATERIAL

This invention relates to decorative laminates and particularly to laminates comprising thermoplastic material.

Thin decorative sheet materials such as Fablon (Registered Trade Mark) formed of a single layer of thermoplastics material about 100 microns thick having a decorated surface on one side are well known. These materials suffer from the disadvantages that any imperfections in the surface to which they are applied show through to the decorated side and furthermore they tend to shrink by an excessive amount.

Decorative laminates comprising thermosetting plastic materials are also known such as those sold under the name Formica (Registered Trade Mark) but these laminates are relatively more expensive and difficult to cut to size and apply to a surface.

It is an object of the present invention to provide a decorative sheet material that may be applied to flat surfaces to obscure surface imperfections and present a decorated outer surface.

According to the present invention there is provided a decorative laminate of thermoplastic material comprising a base layer and a decorative layer, the laminate having a total thickness in the range of 250 to 450 microns and a shrinkage of less than 0.5% at ambient temperatures and a rigidity in the lengthwise and crosswise directions in the range of 25,000 to 30,000 Kilo Newtons per meter square. Having a rigidity in this range ensures that surface imperfections are satisfactorily obscured and also facilitates application of the laminate.

The base layer can be two to four times the thickness of the decorative layer and is preferably of rigid PVC containing only a small amount of plasticizer, if any, i.e. up to 2% by weight, to minimize shrinkage of the laminate. The base layer can comprise entirely recycled material.

A protective layer can be provided on the decorative layer to minimize damage to the decorative layer in use. The protective layer can be a lacquer or a layer of clear film such as plasticized PVC which can have substantially the same thickness as the decorative layer. Alternatively a U.V. curable coating applied at between 5 and 50 grams per meter square, e.g. of polyurethane or polyester, can provide improved mar resistance, scratch resistance and stain resistance as compared to a plasticized PVC film.

The base layer, the decorative layer and the protective layer can each be PVC thermoplastic material but other thermoplastic materials can be used for some of the several layers.

An adhesive layer can be provided on the base layer to facilitate the application of the laminate. The adhesive layer is preferably a pressure sensitive adhesive covered by a release paper which can be readily removed prior to applying the laminate to the surface to be covered.

Examples of laminates according to the present invention will now be described with reference to the FIGURE in the drawing.

EXAMPLE 1

The laminate comprises a base layer 1, of recycled rigid PVC 250 microns thick and not containing plasticizer. A decorative layer 2 of PVC is provided on one side of the base layer. The decorative layer is 90 microns thick and printed with a pattern. To achieve a constant color the decorative layer is primarily of virgin material and can contain normal amounts of plasticizer to facilitate processing. Above the decorative layer is a protective layer 3 of clear plasticizer PVC film 80 microns thick. The total thickness of the laminate is 420 microns.

On the other side of the base layer 1 is a pressure sensitive adhesive 4 covered by a release paper 5 which can be removed from the adhesive before applying the laminate to a surface to be covered.

The rigidity of the laminate in the lengthwise and crosswise directions was 27,000 and 26,000 Kilo Newtons per meter square respectively and the shrinkage of the unapplied laminate over an extended period at ambient temperature was 0.3%.

After removing the release paper a single sheet of the laminate was readily applied to a surface measuring 150 cm × 60 cm without wrinkling or creasing and without air being trapped between the surface and the laminate. Surface imperfections of up to 350 microns both above and below the plane of the surface were not visible through the applied laminate.

The rigidity, combined with a choice of adhesive which develops its full adhesive effect some time after the application of the laminate to the surface, enabled the laminate to be removed and replaced to correct errors in positioning the laminate on the surface.

When the laminate was applied to a melamine surface no shrinkage could be detected in the decorative material after a period of twelve months at ambient conditions.

EXAMPLE 2

The laminate comprises a base layer 1, of rigid PVC 320 microns thick and does not contain any plasticizer. A decorative layer 2 of plasticizer PVC 90 microns thick and printed with a pattern is provided on one side of the base layer. Above the decorative layer is a protective layer formed by a coating applied by roller coating as a mixture of an acrylated polyurethane oligomer and an acrylate monomer and containing an organic photo-initiator. The coating was applied at 10 grams per meter square. The coating was cured by ultra-violet radiation by passing beneath mercury vapour lamps with a power output of 300 watts per linear inch at a speed of 10 to 15 meters per minute per lamp.

The total thickness of the laminate was 420 microns. On the other side of the base layer a pressure sensitive adhesive 4 was provided together with a release paper 5 as in Example 1.

The rigidity of the laminate in the lengthwise and crosswise directions was 30,000 and 28,500 Kilo Newtons per meter square respectively and the shrinkage of the unapplied laminate over an extended period at ambient temperature was 0.25%.

After removing the release paper the laminate was applied as in Example 1. As in Example 1 the laminate could be removed and reapplied and had the ability to obscure surface imperfections of up to 350 microns both above and below the plane of the surface.

We claim:

1. A decorative laminate comprising a protective layer, a continuous decorative layer of polyvinyl chloride and a base layer of rigid polyvinyl chloride containing not more than 2% plasticizer and having a thickness between 2 and 4 times the thickness of the decorative layer, the laminate having a total thickness in the range of 250 to 450 microns, a shrinkage of less than 0.5% at ambient temperatures, and a rigidity in the lengthwise and crosswise directions in the range of 25,000 to 30,000 Kilo Newtons per meter square.

2. A laminate according to claim 1 wherein the base layer comprises recycled material.

* * * * *